(12) United States Patent
Klee et al.

(10) Patent No.: US 9,962,807 B2
(45) Date of Patent: May 8, 2018

(54) ANGLE GRINDER COMPRISING A YAW RATE SENSOR FOR MEASURING THE HOUSING ROTATION

(75) Inventors: Christoph Klee, Stuttgart (DE); Hans-Joerg Faisst, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 1511 days.

(21) Appl. No.: 13/642,177

(22) PCT Filed: Feb. 25, 2011

(86) PCT No.: PCT/EP2011/052778
§ 371 (c)(1),
(2), (4) Date: Mar. 4, 2013

(87) PCT Pub. No.: WO2011/131394
PCT Pub. Date: Oct. 27, 2011

(65) Prior Publication Data
US 2013/0189901 A1    Jul. 25, 2013

(30) Foreign Application Priority Data
Apr. 20, 2010   (DE) .................. 10 2010 027 981

(51) Int. Cl.
*B24B 49/00*   (2012.01)
*B24B 23/02*   (2006.01)
(Continued)

(52) U.S. Cl.
CPC ........ *B24B 49/006* (2013.01); *B23Q 11/0085* (2013.01); *B24B 23/028* (2013.01); *B24B 49/10* (2013.01); *F16P 5/00* (2013.01)

(58) Field of Classification Search
CPC .................. B23Q 11/0085; B24B 49/006
See application file for complete search history.

(56) References Cited

U.S. PATENT DOCUMENTS 5,401,124 A * 3/1995 Hettich ............................ 408/6
6,415,875 B1 * 7/2002 Meixner et al. .................. 173/2
(Continued)

FOREIGN PATENT DOCUMENTS

| CN | 1349873 A | 5/2002 |
|---|---|---|
| CN | 1494973 A | 5/2004 |

(Continued)

OTHER PUBLICATIONS

International Search Report corresponding to PCT Application No. PCT/EP2011/052778, dated May 27, 2011 (German and English language document) (8 pages).

*Primary Examiner* — Hemant M Desai
*Assistant Examiner* — Lucas Palmer
(74) *Attorney, Agent, or Firm* — Maginot, Moore & Beck LLP

(57) ABSTRACT

An angle grinder includes a housing, a drive unit configured to drive a usage tool, a sensor device configured to provide a rotation parameter, and a control unit configured to evaluate the rotation parameter to detect a clamped state of the usage tool. The sensor device has a yaw rate sensor configured to provide the rotation parameter in accordance with a rotational movement of the housing. The control unit triggers a safety mode in accordance with the rotation parameter or throttles the rotational speed and/or torque of the drive unit.

9 Claims, 1 Drawing Sheet

(51) Int. Cl.
*B23Q 11/00* (2006.01)
*B24B 49/10* (2006.01)
*F16P 5/00* (2006.01)

(56) References Cited

U.S. PATENT DOCUMENTS

| | | |
|---|---|---|
| 7,395,871 B2 * | 7/2008 | Carrier et al. .................... 173/1 |
| 7,410,006 B2 * | 8/2008 | Zhang et al. ..................... 173/1 |
| 2003/0034164 A1 * | 2/2003 | Rudolf et al. .................... 173/2 |
| 2003/0116332 A1 * | 6/2003 | Nadig et al. ..................... 173/48 |
| 2004/0011632 A1 | 1/2004 | Hellmann et al. |
| 2005/0259943 A1 * | 11/2005 | Braun et al. ................... 385/147 |
| 2005/0286182 A1 * | 12/2005 | Jackson ............................ 361/23 |
| 2006/0081386 A1 | 4/2006 | Zhang et al. |
| 2006/0255754 A1 * | 11/2006 | Rudolf et al. .................. 318/66 |
| 2006/0260831 A1 * | 11/2006 | Meixner ....................... 173/217 |
| 2007/0084613 A1 * | 4/2007 | Zhang et al. ..................... 173/1 |
| 2007/0093928 A1 * | 4/2007 | Forster et al. ................. 700/168 |
| 2008/0021590 A1 * | 1/2008 | Vanko et al. ................. 700/168 |
| 2008/0032601 A1 * | 2/2008 | Arcona et al. .................... 451/1 |
| 2008/0196911 A1 * | 8/2008 | Krapf et al. ...................... 173/4 |
| 2011/0007436 A1 | 1/2011 | Single et al. |
| 2014/0166323 A1 * | 6/2014 | Cooper ............................. 173/1 |

FOREIGN PATENT DOCUMENTS

| | | |
|---|---|---|
| CN | 1694786 A | 11/2005 |
| CN | 201159251 Y | 12/2008 |
| DE | 10 2004 046 000 A1 | 3/2006 |
| DE | 10 2007 062 727 A1 | 7/2009 |
| EP | 1 201 373 A2 | 5/2002 |
| JP | 2006-82220 A | 3/2006 |
| RU | 2 106 235 C1 | 3/1998 |

* cited by examiner

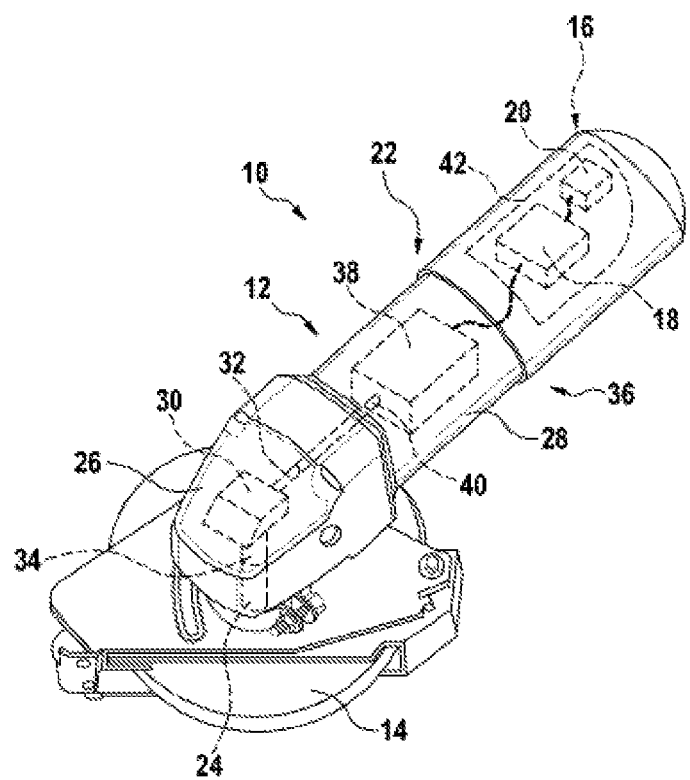

ANGLE GRINDER COMPRISING A YAW RATE SENSOR FOR MEASURING THE HOUSING ROTATION

This application is a 35 U.S.C. § 371 National Stage Application of PCT/EP2011/052778, filed on Feb. 25, 2011, which claims the benefit of priority to Serial No. DE 10 2010 027 981.1, filed on Apr. 20, 2010 in Germany, the disclosures of which are incorporated herein by reference in their entirety.

BACKGROUND

Angle grinders are already known which comprise a drive unit for driving an insertion tool, a sensor device for providing a rotation parameter and a control and/or regulating unit which is provided to evaluate the rotation parameter in order to detect a jammed state of the insertion tool.

SUMMARY

The disclosure is based on an angle grinder comprising a drive unit for driving an insertion tool, a sensor device for providing a rotation parameter and a control and/or regulating unit which is provided to evaluate the rotation parameter in order to detect a jammed state of the insertion tool.

It is proposed that the sensor device have a yaw rate sensor which is provided to provide the rotation parameter as a function of a rotational movement of the housing. As a result, it is possible to detect a rotational movement of the housing, a rotation of the angle grinder housing that is possibly dangerous to an operator can be detected and countermeasures can be initiated. Here, it is advantageously possible to arrange the yaw rate sensor as desired in an angle grinder housing. As a result, cost-effective and simple assembly of the angle grinder can be achieved. In this connection, "rotation parameter" is in particular to be understood to mean an electric and/or electronic signal measured by the sensor device. The sensor device detects a yaw rate of the angle grinder housing and, as a function of a magnitude of the yaw rate, outputs an electric voltage and/or an electronic signal. "Control and/or regulating unit" is in particular to be understood to mean a processor unit having a memory unit and an operating program stored in the memory unit. "Provided" is to be understood in particular to mean specifically programmed, equipped and/or designed. "Rotational movement of the housing" is in particular to be understood to mean a rotational movement of an angle grinder housing about a main axis of rotation of the insertion tool. "As desired" in this connection is to be understood in particular to mean fixed at any desired point within the angle grinder housing, it being necessary for the sensitive axis of the yaw rate sensor to be arranged parallel to the main axis of rotation of the insertion tool.

It is further proposed that the yaw rate sensor be provided to provide the rotation parameter independently of an acceleration of the rotational movement of the housing. As a result, even a non-accelerated rotation of the angle grinder housing can be detected. "Acceleration of the rotational movement of the housing" is to be understood in particular to mean an acceleration of the angle grinder housing about the main axis of rotation of the insertion tool.

It is further proposed that the control and/or regulating unit be provided to trigger a safety mode as a function of the rotation parameter provided by the yaw rate sensor. As a result, it is possible to react specifically to the rotational movement of the housing that is occurring and, depending on the magnitude of the rotational movement of the housing, it is possible for countermeasures to be initiated. In this connection, "safety mode" is in particular to be understood to mean an operating mode of the angle grinder in which the insertion tool, which rotates at a specific rotational speed, is braked to a lower rotational speed. Here, "a lower rotational speed" is intended to be a maximum of 40% of an initial rotational speed.

Furthermore, it is proposed that the control and/or regulating unit be provided to trigger the safety mode only beginning at a defined value of the rotation parameter. As a result, jerky shocks, which are absorbed by the operator himself, so that the angle grinder housing does not begin to rotate, are filtered out. It is thus advantageously possible to detect when the operator himself absorbs a rotational movement of the housing. Unnecessary shutdown of the angle grinder can thus be prevented. In this connection, "defined value" is in particular to be understood to mean a specific angle by which the angle grinder housing has rotated per second.

In a particularly advantageous refinement, in the safety mode, a rotational speed and/or a torque of the drive unit is throttled very highly. As a result, endangering the operator can be prevented particularly simply. In this connection, "throttled very highly" is to be understood in particular to mean reduced to zero. In principle, however, a rotational speed of a few revolutions per minute can also be set. In this connection, "a few revolutions per minute" is to be understood to mean values of less than 5 revolutions per minute. The control and/or regulating unit evaluates the yaw rate of the angle grinder housing. In principle, the control and/or regulating unit is able to evaluate a value dependent on the yaw rate and, as a function thereof, to trigger a safety mode. A "value dependent on the yaw rate" can be, for example, a derivative of the yaw rate or a value which results from combining the yaw rate with a further operating parameter. A "further operating parameter" can be, for example, the rotational speed of the insertion tool.

It is further proposed that the yaw rate sensor have a sensitive axis which is oriented substantially coaxially with respect to a main axis of rotation of the insertion tool. As a result, a rotational movement of the housing can be measured particularly simply and accurately. Here, "sensitive axis" is to be understood in particular to mean the main axis of the yaw rate sensor, about which the yaw rate sensor is able to measure a yaw rate.

It is further proposed that the yaw rate sensor measure the same rotation parameter independently of the positioning in an angle grinder housing. As a result, a particularly simple constructional configuration of the angle grinder can be achieved. Here, "measuring a same rotation parameter" is in particular to be understood to mean that the rotation parameter always has the same value with the same rotation of the angle grinder housing, irrespective of the positioning.

Furthermore, it is proposed that the drive unit be constructed as an unregulated drive unit. This permits a cost-effective configuration of the angle grinder. Here, "unregulated drive unit" is in particular to be understood to mean a drive unit which has no automatic rotational speed regulation to a defined value, in particular to a value that can be set by an operator.

It is further proposed that the control and regulating unit be provided to trigger the safety mode beginning at a rotation parameter of 100 to 500 degrees per second. As a result, a rotation absorbed by the operator himself can be detected particularly simply.

BRIEF DESCRIPTION OF THE DRAWING

Further advantages can be gathered from the following description of the FIGURE. In the drawing, one exemplary embodiment of the disclosure is illustrated. The drawing, the description and the claims contain numerous features in combination. Those skilled in the art will expediently also consider the features individually and combine them into further practical combinations.

FIG. 1 shows a schematic representation of an angle grinder according to the disclosure.

DETAILED DESCRIPTION

FIG. 1 shows a schematic representation of an angle grinder 10 according to the disclosure. The angle grinder 10 has an insertion tool 14. The insertion tool 14 is implemented as a cutting disk which has a main axis of rotation. The insertion tool 14 is provided to be in material-removing contact with a workpiece when in a driven operating state. The insertion tool 14 has a receiving hole, not specifically illustrated, in the middle.

The angle grinder 10 also has an insertion tool holder, not specifically illustrated, and a drive shaft 24. The drive shaft 24 is rotationally fixedly connected to the insertion tool fixing. The drive shaft 24 has an axis of rotation which is arranged coaxially with respect to the main axis of rotation of the insertion tool 14. The insertion tool holder is oriented parallel to the main axis of rotation of the insertion tool 14. When the insertion tool 14 is fitted, the insertion tool holder is arranged at least partly in the receiving hole of the insertion tool 14.

The angle grinder 10 has an angle grinder housing 22. The angle grinder housing 22 comprises a gearbox housing 26 and a motor housing 28. The angle grinder 10 also has a deflection gearbox 30 which is arranged in the gearbox housing 26. The deflection gearbox 30 has an input shaft 32 and an output shaft 34, each of which has an axis of rotation. The axis of rotation of the input shaft 32 and the axis of rotation of the output shaft 34 are orthogonal with respect to each other. The output shaft 34 is rotationally fixedly connected to the drive shaft 24. The gearbox housing 26 is implemented in one piece with the motor housing 28.

The angle grinder 10 also has a handle 36. The handle 36 extends with its main directional extent parallel to the axis of rotation of the input shaft 32. The handle 36 is formed by means of the motor housing 28. The angle grinder 10 comprises a motor unit 38, which is accommodated in the motor housing 28. The motor unit 38 has a motor shaft 40. The motor shaft 40 is rotationally fixedly connected to the input shaft 32 of the deflection gearbox 30. As a result, the insertion tool 14 can be driven by means of the motor unit 38 via the deflection gearbox 30.

The angle grinder further comprises a control and regulating loop 42. The control and regulating loop 42 has a sensor device 16 and a control and regulating unit 18. The sensor device 16 has a yaw rate sensor 20. The yaw rate sensor 20 is arranged in a rear region of the angle grinder housing 22. A sensitive axis of the yaw rate sensor 20 is aligned parallel to the main axis of rotation of the insertion tool 14. For the function of the sensor device 16, the positioning of the yaw rate sensor 20 in the angle grinder housing 22 is in principle arbitrary.

The yaw rate sensor 20 measures a yaw rate of the angle grinder housing 22. The yaw rate sensor 20 provides a rotation parameter as a function of a rotational movement of the housing. The rotation parameter is formed as an electronic signal. The rotation parameter describes the number of degrees of angle by which the angle grinder housing 22 rotates about the sensitive axis per second.

The rotation parameter is transmitted to the control and regulating unit 18. The control and regulating unit 18 evaluates the rotation parameter. The control and regulating unit 18 has a memory unit, in which rotation parameter values are stored. The control and regulating unit 18 compares the rotation parameter measured by the sensor device 16 with the rotation parameter values stored in the memory unit.

If, by comparing the rotation parameter with the rotation parameter values stored in the memory unit, the control and regulating unit 18 detects a rotation of the angle grinder housing 22 that is possibly dangerous to an operator, the control and regulating unit 18 triggers a safety mode. The control and regulating unit 18 triggers the safety mode beginning at a rotation parameter value between 100 and 500 degrees per second. This corresponds to values between 16.6 and 83.3 revolutions per minute. For the evaluation of the rotation parameter, algorithms which, for example, detect a jammed state by using the rotation parameter, are stored in the control and regulating unit 18.

In the safety mode, a motor rotational speed is reduced to zero by the control and regulating unit 18. The motor unit 38 is stopped. In principle, the rotational speed of the motor unit 38 can also merely be throttled to a lower rotational speed, so that the angle grinder housing 22 only continues to rotate to a non-dangerous extent and the operator himself can easily absorb the rotation. In principle, other methods for suppressing the rotation of the angle grinder housing 22 are also conceivable.

In an operating state in which the operator is processing a workpiece, the insertion tool 14 is in material-removing contact with the workpiece. Irregularities in the workpiece and erroneous handling of the angle grinder 10 by the operator can lead to the insertion tool 14 jamming in the workpiece. As a result of the jamming of the insertion tool 14, the angle grinder housing 22 is set rotating if the motor unit 38 is rotating. If the operator applies only an inadequate opposing force or no opposing force which counteracts the rotation, the angle grinder housing rotates. The sensor device 16 measures the rotation parameter and transmits the rotation parameter to the control and regulating unit 18. The control and regulating unit 18 compares the incoming rotation parameter with the rotation parameter value stored in the memory unit. If the rotation parameter exceeds the rotation parameter value stored in the memory unit for a defined time interval, the control and regulating unit 18 detects an undesired rotation of the angle grinder housing 22, i.e. in particular a rotation which has not been absorbed by the operator. The control and regulating unit 18 then triggers the safety mode.

The invention claimed is:

1. An angle grinder, comprising:
   a drive unit configured to drive an insertion tool;
   an angle grinder housing in which the drive unit is arranged;
   a sensor device arranged in the angle grinder housing and including a yaw rate sensor configured to detect a yaw rate of the angle grinder housing and provide a rotation parameter as a function of the detected yaw rate; and
   a control and/or regulating unit configured to evaluate the rotation parameter and to detect a jammed state of the insertion tool based on the rotation parameter.

2. The angle grinder as claimed in claim 1, wherein the yaw rate sensor is configured to provide the rotation parameter independently of an acceleration of a rotational movement of the angle grinder housing.

3. The angle grinder as claimed in claim 1, wherein the control and/or regulating unit is configured to trigger a safety mode as a function of the rotation parameter provided by the yaw rate sensor.

4. The angle grinder as claimed in claim 3, wherein the control and/or regulating unit is configured to trigger the safety mode only beginning at a defined value of the rotation parameter.

5. The angle grinder as claimed in claim 3, wherein one or more of a rotational speed and a torque of the drive unit is throttled very highly in the safety mode.

6. The angle grinder as claimed in claim 1, wherein the yaw rate sensor is configured to detect the yaw rate of the angle grinder housing about a sensitive axis oriented substantially coaxially with respect to a main axis of rotation of the insertion tool.

7. The angle grinder as claimed in claim 1, wherein the yaw rate sensor detects the yaw rate of the angle grinder housing irrespective of a position of the yaw rate sensor in the angle grinder housing.

8. The angle grinder as claimed in claim 1, wherein the drive unit is an unregulated drive unit.

9. The angle grinder as claimed in claim 1, wherein the control and/or regulating unit is configured to trigger a safety mode beginning at a rotation parameter of 100 to 500 degrees per second.

* * * * *